United States Patent
Okanohara et al.

(10) Patent No.: US 11,921,566 B2
(45) Date of Patent: *Mar. 5, 2024

(54) ABNORMALITY DETECTION SYSTEM, ABNORMALITY DETECTION METHOD, ABNORMALITY DETECTION PROGRAM, AND METHOD FOR GENERATING LEARNED MODEL

(71) Applicant: Preferred Networks, Inc., Tokyo (JP)

(72) Inventors: Daisuke Okanohara, Tokyo (JP); Kenta Oono, Tokyo (JP)

(73) Assignee: PREFERRED NETWORKS, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,992

(22) Filed: Apr. 8, 2022

(65) Prior Publication Data

US 2022/0237060 A1  Jul. 28, 2022

Related U.S. Application Data

(63) Continuation of application No. 17/038,250, filed on Sep. 30, 2020, now Pat. No. 11,334,407, which is a
(Continued)

(30) Foreign Application Priority Data

Dec. 1, 2015  (JP) ................. 2015-234923

(51) Int. Cl.
*G06F 11/00* (2006.01)
*G06F 11/07* (2006.01)
(Continued)

(52) U.S. Cl.
CPC .......... *G06F 11/0703* (2013.01); *G06F 11/07* (2013.01); *G06N 3/045* (2023.01);
(Continued)

(58) Field of Classification Search
CPC .. G06F 11/0703; G06F 11/07; G06F 11/2257; G06F 11/2263
(Continued)

(56) References Cited

U.S. PATENT DOCUMENTS 5,331,550 A     7/1994  Stafford et al.
5,465,321 A *  11/1995  Smyth ................. G06F 11/2257
                                                             706/20
(Continued)

FOREIGN PATENT DOCUMENTS

JP    H01-199127 A    8/1989
JP    H06-325012 A   11/1994
(Continued)

OTHER PUBLICATIONS

"[Survey] Adversarial Autoencoders", Apr. 16, 2016; Masataka Ohashi, http://qiita.com/supersaiakujin/items/::a3c75c77417db5037db, 13 pages.
(Continued)

*Primary Examiner* — Sarai E Butler
(74) *Attorney, Agent, or Firm* — Foley & Lardner LLP

(57) ABSTRACT

A method and system that efficiently selects sensors without requiring advanced expertise or extensive experience even in a case of new machines and unknown failures. An abnormality detection system includes a storage unit for storing a latent variable model and a joint probability model, an acquisition unit for acquiring sensor data that is output by a sensor, a measurement unit for measuring the probability of the sensor data acquired by the acquisition unit based on the latent variable model and the joint probability model stored by the storage unit, a determination unit for determining whether the sensor data is normal or abnormal based on the probability of the sensor data measured by the measurement unit, and a learning unit for learning the latent
(Continued)

variable model and the joint probability model based on the sensor data output by the sensor.

19 Claims, 10 Drawing Sheets

Related U.S. Application Data continuation of application No. 15/780,355, filed as application No. PCT/JP2016/005043 on Dec. 1, 2016, now Pat. No. 10,831,577.

(51) Int. Cl.

| | | |
|---|---|---|
| *G06N 3/045* | (2023.01) | |
| *G06N 3/08* | (2023.01) | |
| *G06N 7/00* | (2023.01) | |
| *G06N 7/01* | (2023.01) | |
| G06N 3/04 | (2023.01) | |
| G06V 20/90 | (2022.01) | |

(52) U.S. Cl.
CPC ............... *G06N 3/08* (2013.01); *G06N 7/00* (2013.01); *G06N 7/01* (2023.01); G06N 3/04 (2013.01); G06V 20/90 (2022.01)

(58) Field of Classification Search
USPC ...................................................... 714/1–57
See application file for complete search history.

(56) References Cited

U.S. PATENT DOCUMENTS

| | | | |
|---|---|---|---|
| 6,577,768 B1 | 6/2003 | Ushida | |
| 10,388,274 B1 | 8/2019 | Hoffmeister | |
| 2004/0168100 A1 | 8/2004 | Thottan et al. | |
| 2007/0005202 A1 | 1/2007 | Breed | |
| 2010/0061624 A1* | 3/2010 | Cobb | G06K 9/6215 382/157 |
| 2010/0274433 A1 | 10/2010 | Prokhorov et al. | |
| 2013/0110992 A1 | 5/2013 | Ravindra et al. | |
| 2013/0325782 A1 | 12/2013 | Fujimaki et al. | |
| 2014/0201570 A1 | 7/2014 | Bielman et al. | |
| 2014/0257803 A1* | 9/2014 | Yu | G10L 15/16 704/232 |
| 2015/0066496 A1* | 3/2015 | Deoras | G06N 3/0472 704/232 |
| 2015/0254555 A1* | 9/2015 | Williams, Jr. | G06N 3/084 706/14 |
| 2015/0317284 A1 | 11/2015 | Takahashi | |
| 2016/0155136 A1* | 6/2016 | Zhang | G06N 3/045 705/7.29 |
| 2016/0274963 A1 | 9/2016 | Aisu et al. | |
| 2017/0063399 A1 | 3/2017 | Richardson et al. | |
| 2018/0365089 A1 | 12/2018 | Okanohara et al. | |

FOREIGN PATENT DOCUMENTS

| | | |
|---|---|---|
| JP | 2007-326654 A | 12/2007 |
| JP | 2009-276334 A | 11/2009 |
| JP | 2012-098901 A | 5/2012 |
| JP | 2015-210750 A | 11/2015 |

OTHER PUBLICATIONS

"Adversarial Autoencoders", Alireza Makhazani et al., May 25, 2016, https://arxiv.org/abs/1511.05644, 16 pages.
"Auxiliary Deep Generative Models", Lars Maaloe et al., Jun. 16, 2016, http:/iarxiv.org/abs/1602.05473, 9 pages.
"Contrastive Divergence and Related Topics", Shin-ichi Maeda, Jul. 1, 2014, Journal of the Japanese Society for Artificial Intelligence 29(4), 15 pages.
"Dimensionality Reduction with the Autoencoder for Anomaly Detection of Spacecrafts", Mayu Sakurada et al., May 12, 2014, The 28th Annual Conference of the JSAI, 2014, 3 pages.
"Energy-based Generative Adversarial Networks", Junbo Zhao et al., Mar. 6, 2017, https://arxiv.org/abs/1609.03126, 17 pages.
"Hierarchical Variational Models", Rajesh Ranganath et al., May 30, 2016, http:/iarxiv.org/pdf/1511.02386.pdf.
"International Search Report and Written Opinions of the International Searching Authority," dated Feb. 17, 2017, PCT No. PCT/JP2016/005043, International Filing Date: Dec. 1, 2016, 15 pages.
"Morphing Faces," (Archived on Nov. 20, 2015) Available online, URL: <https://web.archive.org/web/20151120071025/http://vdumoulin.github.io/morphing_faces/>.
"Morphing Faces," (Searched on Oct. 15, 2019) Available online, URL: <http://vdumoulin.github.io/morphing_faces/>.
"Note on the equivalence of hierarchical variational models and auxiliary deep generative models", Niko Brummer, Mar. 9, 2016, http:/arxiv.org/abs/1603.02443, 6 pages.
"Trial of lung cancer determination by applying Deep Learning to human urine data and search of the target substance", Yasutaka Mende et al., Nov. 8, 2015, The 106th Special Internet Group on Knowledge-based Software Shiryo, 6 pages.
Alireza Makhzani et al. "Adversarial Autoencoders," arXiv: 1511.05644, Nov. 18, 2015.
Breunig et al., "LOF: Identifying Density-Based Local Outliers," ACM SIGMOD Record (Jun. 2000), Available online, URL: <https://www.dbs.ifi.lmu.de/Publikationen/Papers/LOF.pdf>.
Cheung et al., "Discovering Hidden Factors of Variation in Deep Networks," retrieved from the Internet, pp. 1-10 (Jun. 2015).
Emrecan Bati et al., "Hyperspectral Anomaly Detection Method Based on Auto-encoder," Proceedings of Spie, vol. 9643, Image and Signal Processing for Remote Sensing XXI, Oct. 15, 2015.
Goodfellow et al., "Generative Adversarial Nets," arXiv, (Jun. 10, 2014), Available online URL: <http://arxiv.org/pdf/1406.266 1v1.pdf>.
Kingma et al., "Auto-Encoding Variational Bayes," arXiv (May 1, 2014) Available online, URL: <https://arxiv.org/pdf/1312.61 14.pdf>.
Kingma et al., "Semi-supervised Learning with Deep Generative Models," NIPS'14 Proceedings of the 27th International Conference on Neural Information Processing Systems—vol. 2 (Dec. 8, 2014), Available online, URL: <http://papers.nips.cc/paper/5352-semi-supervisedlearning-withdeepgenerative-models.pdf>.
Manevitz et al., "One-Class SVMs for Document Classification," Journal of Machine Learning Research 2 (Dec. 1, 2001) pp. 139-154, Available online, URL: <http://www.jmlr.org/papers/volume2/manevitz01a/manevit z01a.pdf>.
Mayu Sakurada et al., "Anomaly Detection Using Autoencoders with Nonlinear Dimensionality Reduction," MLSDA'14:Proceedings of the ML SDA 2014 2nd Workshop on Machine Learning for Sensory Data Analysis, Dec. 2014.
Notice of Allowance dated Jul. 27, 2020, in U.S. Appl. No. 15/780,355 (US 2018-0365089).
Office Action dated Apr. 24, 2020, in U.S. Appl. No. 15/780,355 (US 2018-0365089).
Office Action dated Oct. 31, 2019, in U.S. Appl. No. 15/780,355 (US 2018-0365089).
Pal et al., "Multi-Conditional Learning for Joint Probability Models with Latent Variables," NIPS Workshop Advances Structured Learning Text and Speech Processing (Jan. 1, 2006).
Rezende et al., "Stochastic backpropagation and Approximate Inference in Deep Generative Models", (May 12, 2014).
Sakurada et al., "Anomaly Detection Using Autoencoders with Nonlinear Dimensionality Reduction," Machine Learning for Sensory Data Analysis, ACM (Dec. 2, 2014) pp. 1-8.
Scholkopf et al., "Support Vector Method for Novelty Detection," NIPS'99 Proceedings of the 12th International Conference on Neural Information Processing Systems, (Nov. 29, 1999), Available online, URL: <https://papers.nips.cc/paper/1723-support-vectormethod-for-noveltydetection.pdf>.
Sønderby et al., "Ladder Variational Autoencoders", arXiv:1602.02282v3, May 27, 2016.
Tatsuji Hara "The probabilistic approach in identification/control" The Society of Instrument and Control Engineers, vol. 39, No. 12,

(56) References Cited

OTHER PUBLICATIONS pp. 727-729 (Dec. 10, 2000) https://www.jstage.jst.go.jp/article/sicejl1962/39/12/39_12_727/_pdf/-char/ja.
Notice of Allowance dated dated Jan. 10, 2022 in U.S. Appl. No. 17/038,250 (US 2021-0011791).
Office Action dated Sep. 2, 2021 in U.S. Appl. No. 17/038,250 (US 2021-0011791).
Otto Fabius et al., Variational Recurrent Auto-Encoders, ICLR 2015, Jun. 15,2015, pp. 1-5, https://arxiv.org/pdf/1412.6581v6.pdf.
Alireza Makhzani et al., "Adversarial Autoencoders", arXiv:1511.05644v1 [cs.LG], Nov. 18, 2015 URI: https://arxiv.org/abs/1511.05644v1.
Junbo Zhao et al., "Energy-based Generative Adversarial Networks", arXiv:1609.03126v3 [cs.LG], Nov. 4, 2016 URI: https://arxiv.org/abs/1609.03126v3.
Rajesh Ranganath et al., "Hierarchical Variational Models", arXiv:1511.02386v1 [stat.ML], Nov. 7, 2015 URI: https://arxiv.org/abs/1511.02386v1.
Michael E. Tipping et al., "Mixtures of Probabilistic Principal Component Analysers", Neural Computation, Jun. 26, 2006, pp. 443-482, vol. 11, Issue 2 (30 pages).
Minoru Inui et al., "Comparison of Anomaly Detection Methods Using Dimensionality Reduction and Reconstruction Error", The 23rd Annual Conference ofthe Japanese Society for Artificial Intelligence, 2009, pp. 1-4, With English Translation (12 pages).
Takehisa Yairi et al., "Anomaly detection in spacecraft telemetry data based on time-series association rule mining", The 15th Annual Conference of Japanese Society forArtificial Intelligence, 2001, pp. 1-3, With English Translation (10 pages).
"Is deep learning universal?" Nikkei Electorinics No. 1156, Jun. 2015, pp. 30-37, Nikkei Business Publication, Inc.

\* cited by examiner

ABNORMALITY DETECTION SYSTEM, ABNORMALITY DETECTION METHOD, ABNORMALITY DETECTION PROGRAM, AND METHOD FOR GENERATING LEARNED MODEL

CROSS-REFERENCE TO RELATED APPLICATIONS

The present application is a continuation of U.S. application Ser. No. 17/038,250, filed on Sep. 30, 2020, which is a continuation of U.S. application Ser. No. 15/780,355, filed May 31, 2018, which is the U.S. National Stage of International Application PCT/JP2016/005043, filed Dec. 1, 2016, and claims priority to Japanese Patent Application No. 2015-234923 filed Dec. 1, 2015. The entire contents of the foregoing applications are incorporated by reference.

TECHNICAL FIELD

Embodiments related to an abnormality detection system, an abnormality detection method, an abnormality detection program, and a method for generating a learned model.

BACKGROUND

Conventionally, identification of failure determination and failure cause of a machine has been carried out by comparing sensor data at the time of normal operation of the machine with sensor data at the time of failure in the past (for example, see a flowchart showing processing routine of failure determination of FIG. 13 of Patent Literature 1 below). In this determination, in order to accurately and efficiently compare sensor data, failure cause can be classified highly accurately and efficiently by accurately and efficiently selecting a sensor which is a transmission source of the sensor data.

However, when the number of selected sensors is large, a huge number of man-hours are required to select an appropriate sensor. In addition, in order to select an appropriate sensor, it was necessary to have knowledge of each sensor attached to the machine and knowledge of machine-like characteristics of a target machine.

Related background art citation: patent literature 1: JP 2012-098901 A

With regard to the technical problem being solved, machines with advanced control today are controlled and managed by multiple sensors. For example, in automobiles, more than 100 types of sensors are installed per vehicle. In the case of new machines and unknown failures, even those with an advanced expertise and abundant experience could not deal with such case. Therefore, it is desired to realize a method or a system that efficiently selects a sensor without requiring advanced expertise or abundant experience.

Furthermore, even if sensor selection can be made efficiently, a definition of sensor data, including noise, error, and failure in events that need to be addressed, is complicated. Besides, depending on an application to be applied, the definition of the event that needs to be addressed is different, so general-purpose means to detect sensor's data is desired.

In order to detect sensor data, it is necessary to design an abnormality score function for each sensor data and each application. Therefore, it used to be necessary to design an abnormality score function each time sensor data and the number of application increased, and there used to be a fear that information important for abnormality detection is missed in feature design.

In data and application sensor data frequency domain, if an event is a rare event in the first place and multiple factors overlap, the model, rule, or threshold design was very difficult, so a more generalized and adaptive system is demanded.

In order to solve the problem in the above-described prior art, embodiments of the present invention provide, for example, an abnormality detection system, an abnormality detection method, an abnormality detection program, and a method for generating learned model, which learns various sensor data and application data output from an information system supporting social infrastructure such as electric power, water supply, gas, transportation, communication, medical care, finance, service, and determines (including predicting) normality/abnormality of possible events.

SUMMARY OF EMBODIMENTS

An abnormality detection system of the present invention includes: storage means for storing a latent variable model and a joint probability model previously learned; acquisition means for acquiring input data of abnormality detection target; an encoder for inferring a latent variable from the input data based on the latent variable model stored in the storage means; a decoder for generating restored data from the latent variable based on the joint probability model stored in the storage means; and determining means for determining whether the input data is normal or abnormal based on deviation between the input data and the restored data.

In addition, in the abnormality detection system of the present invention, the determining means determines an amount of deviation between the input data and the restored data based on probability calculated according to parameters obtained in processes at the encoder and decoder.

In addition, in the abnormality detection system of the present invention, the determining means calculates deviation of a component for each dimension of the input data and the restored data and determines abnormality when there is a large divergence in any dimension.

In addition, the abnormality detection system of the present invention further includes learning means for learning the latent variable model and the joint probability model based on training data composed of normal data.

In addition, in the abnormality detection system of the present invention, the measuring means constructs the encoder and the decoder by any one of VAE, AAE, LVAE, ADGM.

Embodiments of the present invention can be described not only as an invention of abnormality detection system as described above, but also as an invention of abnormality detection method and abnormality detection program respectively as follows. They are substantially the same invention except for being in different categories, and achieve the same actions and effects. The present invention can also be described as an invention of method for generating a learned model used in the abnormality detection system, the abnormality detection method, and the abnormality detection program described above.

An abnormality detection method according to the present invention is an abnormality detection method executed by an abnormality detection system including storage means for storing a latent variable model and a joint probability model previously learned, the abnormality detection method including: an acquisition step of acquiring input data of abnormality detection target; an inference step of inferring a latent variable from the input data based on the latent variable model stored in the storage means; a generation step of generating restored data from the latent variable based on the joint probability model stored in the storage means; and a determination step of determining whether the input data is normal or abnormal based on deviation between the input data and restored data.

An abnormality detection program according to the present invention causes a computer to function as: storage means for storing a latent variable model and a joint probability model previously learned; acquisition means for acquiring input data of abnormality detection target; an encoder for inferring a latent variable from the input data based on the latent variable model stored in the storage means; a decoder for generating restored data from the latent variable based on the joint probability model stored in the storage means; and determining means for determining whether the input data is normal or abnormal based on deviation between the input data and the restored data.

A generation method for generating a learned model according to the present invention is a generation method for generating a learned model including a latent variable model and a joint probability model for performing abnormality detection of input data, the generation method including: a training data acquisition step of acquiring at least one or more pieces of training data consisting of normal data; an inference step of inferring a latent variable from the training data based on the latent variable model; a generation step of generating restored data from the latent variable based on the joint probability model; a deviation calculation step of calculating deviation between the training data and the restored data; and a parameter updating step of updating parameters of the latent variable model and the joint probability model based on the deviation.

With respect to advantageous effects, according to the present invention, it is possible to select a sensor that is considered to be effective for classifying failure cause more easily than in the past. For example, it is possible to select a sensor that is considered to be effective for classifying failure cause without requiring machine knowledge.

According to the present invention, it is possible to reduce false alarms of abnormality determination by properly reflecting a state of a device on abnormality determination. In addition, abnormality determination at an earlier stage becomes possible according to the fluctuation factor of device operation data. By doing so, it is possible to present appropriate response behavior to maintenance personnel and operators.

According to the present invention, it is possible to suppress the influence of outliers by updating learning data using sensor data which is diagnosed to be normal. Moreover, it is possible to follow deterioration over time.

DETAILED DESCRIPTION

Figure 1:
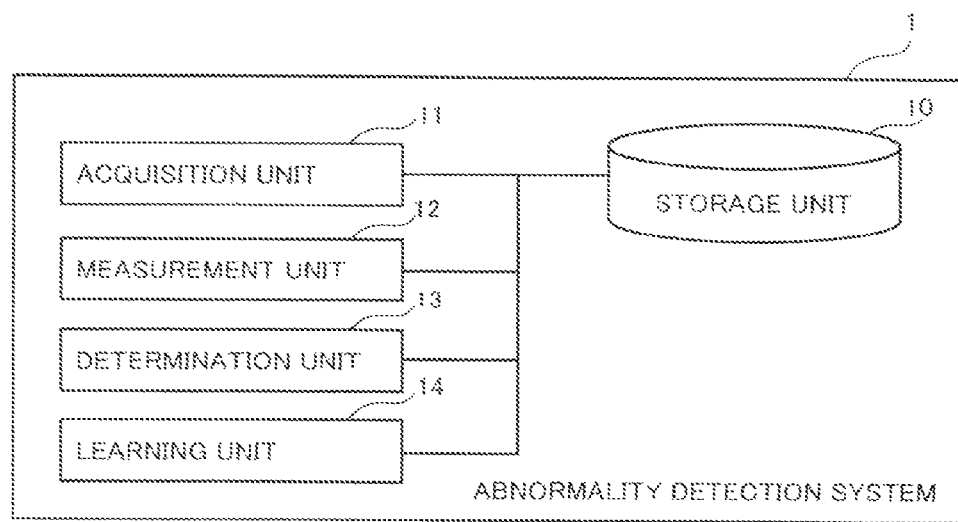
FIG. 1 is a functional block diagram of an abnormality detection system according to an embodiment of the present invention.

Hereinafter, preferable embodiments of an abnormality detection system, an abnormality detection method, and an abnormality detection program will be described in detail together with the drawings. In the description of the drawings, the same reference numerals are given to the same elements, and redundant explanations are omitted.

FIG. 1 is a functional block diagram of an abnormality detection system 1 according to an embodiment of the present invention. As shown in FIG. 1, the abnormality detection system 1 includes a storage unit 10 (storage means), an acquisition unit 11 (acquisition means), a measurement unit 12 (measurement means), a determination unit 13 (determination means) and a learning unit 14 (learning means).

The storage unit 10 stores a latent variable model and a joint probability model. The storage unit 10 is a data base, for example. The acquisition unit 11 acquires the sensor data output by the sensor. The measurement unit 12 measures the probability of the sensor data acquired by the acquisition unit 11 based on the latent variable model and the joint probability model stored by the storage unit 10. The determination unit 13 determines whether the sensor data is normal or abnormal based on the probability of the sensor data measured by the measurement unit 12. The learning unit 14 learns the latent variable model and the joint probability model based on the sensor data output by the sensor.

The measurement unit 12 may convert the sensor data acquired by the acquisition unit 11 into a dimension lower than the dimension of the sensor data based on the latent variable model stored by the storage unit 10, and may convert it into the original dimension based on the joint probability model stored by the storage unit 10, thereby measuring the probability. The measurement unit 12 may measure the probability using a variant self-coder. The learning unit 14 may learn the latent variable model and the joint probability model based only on the sensor data output by the sensor at the normal time.

Figure 2:
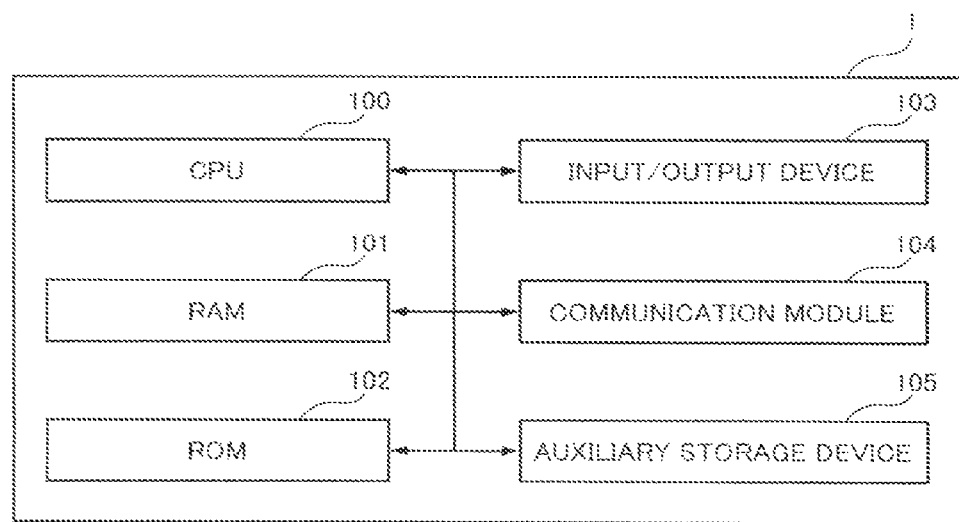
FIG. 2 is a figure illustrating a hardware configuration of the abnormality detection system according to the embodiment of the present invention.

The abnormality detection system 1 is composed of hardware such as a CPU. FIG. 2 shows an example of hardware configuration of the abnormality detection system 1. As shown in FIG. 2, the abnormality detection system 1 shown in FIG. 1 is configured as a computer system that physically includes a CPU 100, a RAM 101 which is a main storage device, and a ROM 102, an input/output device 103 such as a display, a communication module 104, and an auxiliary storage device 105, and the like.

The function of each function block of abnormality detection system 1 shown in FIG. 1 is realized by loading predetermined computer software on the hardware such as CPU 100 and RAM 101 shown in FIG. 2, causing the input/output device 103, the communication module 104, and the auxiliary storage device 105 to operate under the control of the CPU 100, and reading and writing data in the RAM 101.

Figure 3:
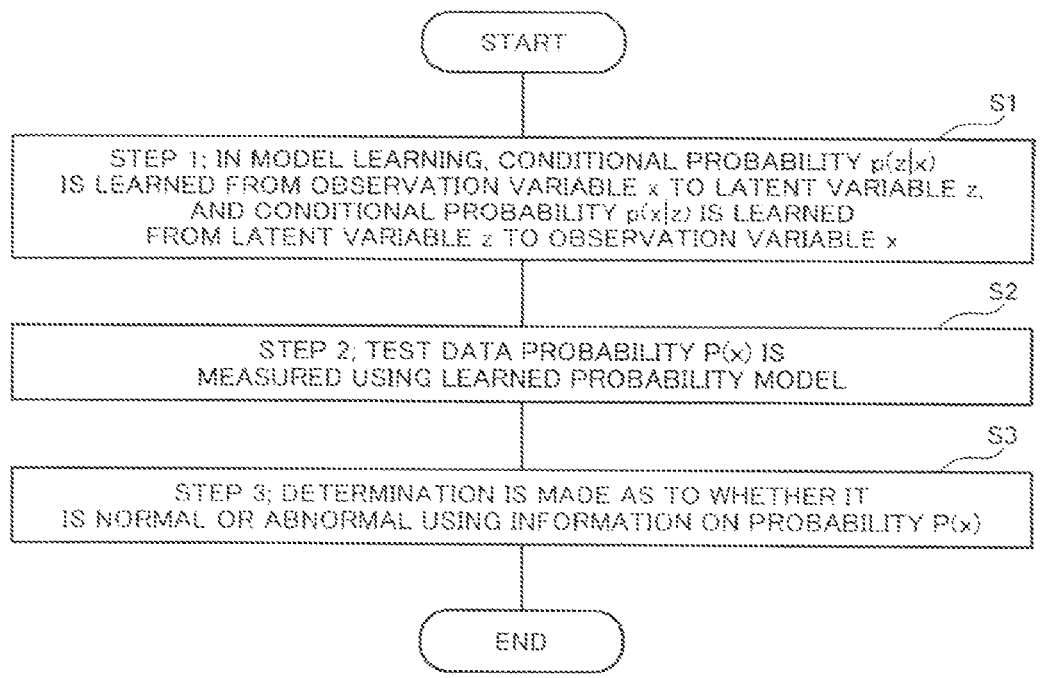
FIG. 3 is a flowchart showing a process (abnormality detection method) executed by the abnormality detection system according to the embodiment of the present invention.

Steps included in abnormality detection system 1: The abnormality detection system 1 includes three steps (FIG. 3).
- step 1; step of simultaneously learning latent variable model and joint probability model (realized by learning unit 14).
- step 2; step of measuring the test data probability p(x) using the latent variable model and the joint probability model learned (realized by the acquisition unit 11 and the measurement unit 12).
- step 3; step of determining whether it is normal or abnormality using the information on the probability p(x) (realized by the determination unit 13).

[1. Step 1] Step 1 is a step of simultaneously learning the latent variable model and the joint probability model.

In step 1, a conditional probability p(z|x) is learned from an observation variable x to a latent variable z, and a conditional probability p(x|z) is learned from the latent variable to the observation variable.

When learning the conditional probability p(z|x) and the conditional probability p(x|z), a neural network may be used. By using the neural network, it is possible to learn linearly with respect to the number of parameters regardless of the observed number of pieces of data.

The latent variable model is obtained by modeling the conditional probability p(z|x) using a neural network, for example. The latent variable model is stored by the storage unit 10.

The joint probability is expressed by p(x, z) or p(z)·p(x|z). The joint probability model is obtained by modeling the joint probability independently using, for example, a neural network. The joint probability model is stored by the storage unit 10.

The neural network is not limited in its composition. For example, it may include a total coupling layer, a nonlinear function (sigmoid, relu), a batch normalization layer, a dropout layer.

The input data (sensor data output by the sensor) is acquired from the sensor and the like by the acquisition unit 11. The input data is not particularly limited. The input data is, for example, a multidimensional array, a tensor, or the like. The input data acquired by the acquisition unit is not limited to sensor data from the sensor, but various data may be the target as long as it is data to be subjected to abnormality detection.

When the input data x is an n-dimensional vector, each value is, for example, a continuous value, a discrete value, or the like. When there are multiple pieces of input data, it can be extended to multidimensional array or tensor.

Specific examples of sensor include a camera mounted on the robot, a three-dimensional acceleration sensor, an actuator, a temperature sensor, a humidity sensor, and the like. Specific examples of sensor data include image data from the camera, position, velocity, and acceleration information from the three-dimensional acceleration sensor, the current and voltage amount applied to the actuator, those separated by a window width in an appropriate time, or one obtained by frequency-decomposing each one of them.

Figure 5:
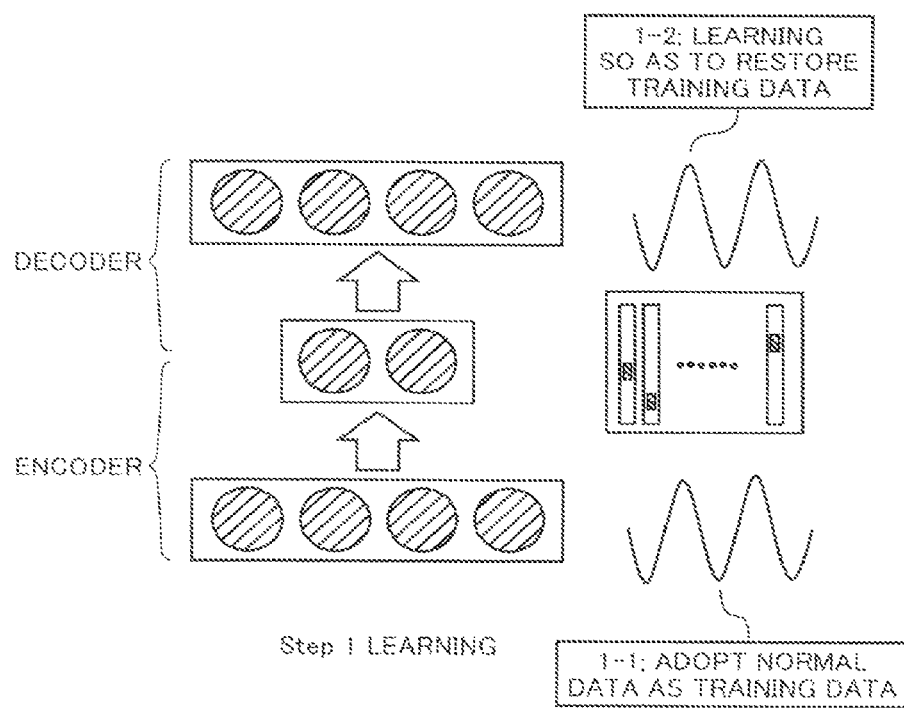
FIG. 5 shows an abnormality detection system according to the embodiment of the present invention using VAE (part 1).
Figure 6:
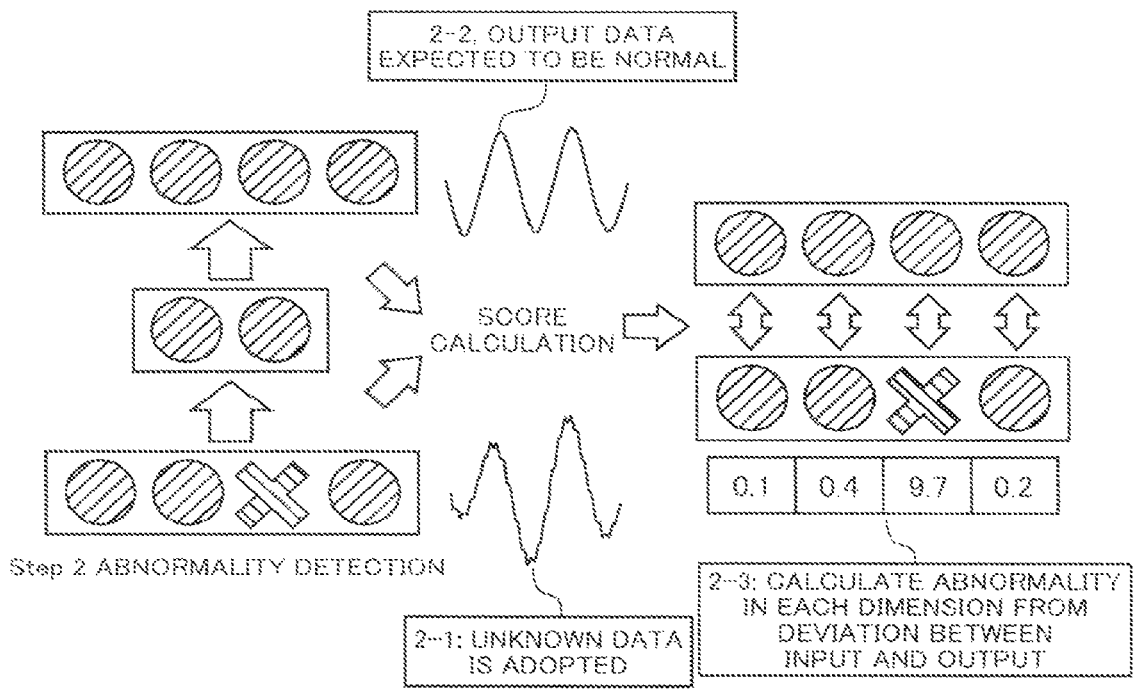
FIG. 6 shows an abnormality detection system according to the embodiment of the present invention using VAE (part 2).
Figure 7:
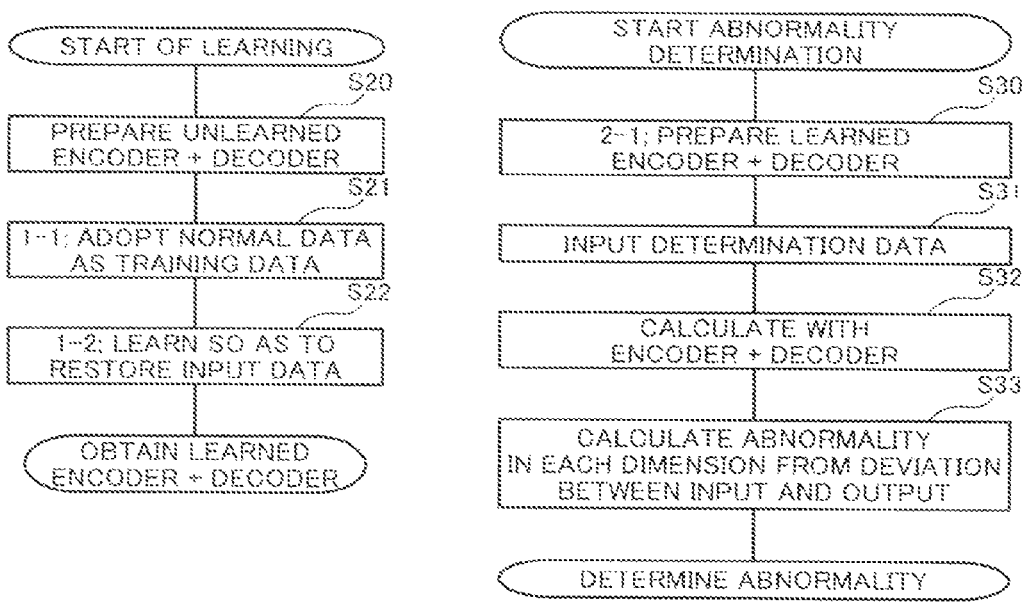
FIG. 7 is a flowchart showing a process (abnormality detection method) executed by the abnormality detection system according to the embodiment of the present invention using the VAE.

In step 1 to step 3, SVM or LOF may be used to determine whether it is normal or abnormal, or a variational auto encoder (hereinafter referred to as VAE) may be used to determine whether it is normal or abnormal. Especially, it is preferable to use VAE (FIGS. 5 to 7).

At this time, when learning the latent variable model, that is, the conditional probability p(z|) from observation variable x to latent variable z using VAE in step 1, the learner is called an encoder. On the other hand, when learning the conditional probability p(x|z) from the latent variable z to the observation variable x, the learner is called a decoder.

The input of the encoder is sensor data, obtained by testing the device (sampling at an appropriate time interval is given for a fixed time). It should be noted that the test is performed a plurality of times continuously or periodically. The output of the decoder is represented by abnormality degree and probability of each dimension of sensor data.

The VAE can issue probability values more easily than SVM or LOF. Therefore, the abnormality detection system 1 makes it easier to compare abnormality scores when using VAE, even for sensors with different physical quantities than when using SVM or LOF.

In addition, the VAE can perform nonlinear conversion of data expression more easily than SVM or LOF. Therefore, the abnormality detection system 1 can create a more complicated data expression distribution when using VAE than when using SVM or LOF.

The VAE can also issue abnormality scores for each dimension of input data as compared with SVM or LOF. Therefore, in abnormality detection system 1, it is easier to identify the input data source that becomes the cause of an abnormality event when using VAE than when using SVM or LOF.

The VAE can learn similarity faster than SVM or LOF. Therefore, the abnormality detection system 1 does not need to manually design similarity between data when using VAE as compared with a case of using SVM or LOF.

For example, when using VAE, $$p(z) \sim N(0, I)$$

$$p(x|z) \sim N(\mu(z), \sigma(z))$$

$N(\mu, \sigma)$ is a normal distribution consisting of mean $\mu$ and variance $\sigma$.

$\mu(z)$, $\sigma(z)$ are outputs from the neural network.

In the abnormality detection system 1, the loss function is minimized when learning the conditional probability p(z|x) and p(x|z) in the encoder and decoder. For example, a negative logarithmic probability $-\log p(x)$ or the like can be used as the loss function:

$$-\log p(x) = -\log \Pi p(x\_i) = -\Sigma \log \int p(x\_i | z) p(z) dz$$

When integrating with z, the variational lower limit is calculated by the following equation. For the variational lower limit, the positive logarithmic probability log p(x)=log Πp(x_i) is evaluated from the lower limit.

$$-\log \Pi p(x\_i) = -\Sigma\_i \log \int p(x\_i \mid z; \theta) p(z) dz <=$$

$$-\Sigma\_i q(z \mid x; \xi) \int \log p(x\_i \mid z; \theta) p(z) / q(z \mid x\_i; \xi) dz =$$

$$\Sigma\_i E\_\{q(z \mid x\_i; \xi)\} [p(x\_i \mid z; \theta)] - KL(p(z) \| q(z \mid x\_i; \xi))$$

Here, E_{q(z|x_i;ξ)}[•] is the expected value for q(z|x_i; ξ). KL(p||q) is the KL distance of the distribution p, q.

In order to maximize the above-mentioned variational lower limit, θ and ξ are optimized. At this time, the learning speed can be increased by the inverse error propagation method. For example, a Reparameterization Trick can be used.

[2. Step 2]: Step 2 is a step of measuring the test data probability p(x) using the learned latent variable model and the joint probability model.

[3. Step 3]: Step 3 is a step of determining whether it is normal or abnormal using the information on the probability p(x).

In step 3, whether or not the test data probability p(x) is smaller than the threshold value, whether or not the nth-order differentiation of the test data probability p(x) is smaller than the threshold value, or a combination thereof is used to determine whether it is normal or abnormal.

For example, when determining whether the value indicated by certain sensor data is normal or abnormal, conversion is made to x→z→x', and at that occasion, whether normal or abnormal can be determined by measuring the difference between x' and x.

For the sensor, its target and its number are not limited. For example, it may be strength per time, or strength per frequency. Alternatively, the sensor may be for different devices.

In a first embodiment, as described above, when disturbance probability distribution changes during normal operation and during abnormality in repetitive operation, the abnormality detection system 1 learns probabilistic model P with normal data, and predicts the observation data x, probability p(x) change by P by abnormality.

Figure 4:
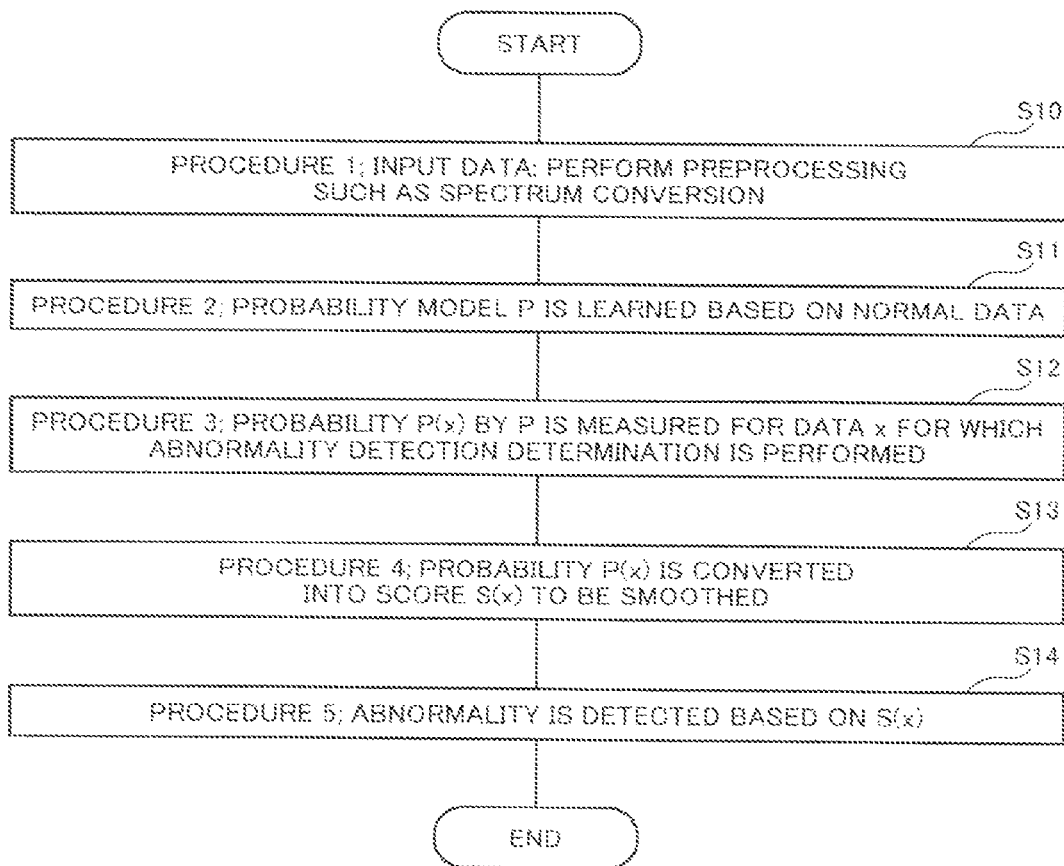
FIG. 4 is a flowchart showing a process (abnormality detection method) executed in the embodiment of the abnormality detection system according to the embodiment of the present invention.

Hereinafter, as an example of an embodiment of the present invention, a system that executes five procedures is shown. Procedures 1 to 5 of abnormality detection system 1 will be described below (FIG. 4).

[Procedure 1]: In procedure 1 (realized by the acquisition unit 11), preprocessing on the input data is performed. For example, spectrum conversion may be performed.

[Procedure 2]: In procedure 2 (realized by the learning unit 14), the probabilistic model P is learned so as to input the data group in the normal state as training data and restore the input data. For example, a vector in which spectra are arranged can be input x.

When the number of dimensions is several thousand dimensions, it is difficult to estimate the probability model of a high dimensional vector. Therefore, in abnormality detection system 1, deep learning is used for estimation of probability model. For example, it becomes the following latent variable model. Note: ":=" in the following mathematical expression indicates the meaning of "to define".

$$p(x; \theta) := \int p(x, z; \theta) dz \ p(x, z; \theta) := p(x \mid z; \theta) p(z)$$

In the above: z is generated from N(0, I), then from z, x is generated from N(μ(z;θ), σ(z;θ)). However, the neural network characterized by μ(z;θ), σ(z;θ) parameter θ is used. Then, θ is optimized so as to maximize the log probability Σ log p(x;θ) of the training data X.

The optimization of θ is difficult because of the calculation of the sum of the log probability.

$$p(x; \theta) := \int p(x \mid z; \theta) p(z) dz$$

Therefore, in abnormality detection system 1, the following variational lower limit is used.

$$\log p(x; \theta) := \log \int p(x, z; \theta) dz$$

$$= \log \int p(x, z; \theta) q(z \mid x; \varphi) / q(z \mid x; \varphi) dz$$

$$>= \int q(z \mid x; \varphi) \log p(x, z; \theta) / q(z \mid x; \varphi) dz$$

$$= Eq(z \mid x; \varphi)[\log p(x, z; \theta) / q(z \mid x; \varphi)]$$

$$= L(\theta, \varphi)$$

Here, φ is a parameter that characterizes a neural network that generates a joint probability model. In the above equation: q(z, x) means the probability distribution defined by the neural network. Then, q(z|x) means the conditional probability of x conditioned by z calculated with its probability distribution q(z, x).

At this time, in order to maximize L(θ, φ), θ and φ are simultaneously optimized by using a variational auto encoder (hereinafter referred to as VAE).

$$L(\theta, \varphi) = Eq(z \mid x; \varphi)[\log p(x, z; \theta) / q(z \mid x; \varphi)]$$

Specifically, the gradients dL/dθ and dL/dφ are obtained for the L(θ, φ) maximization parameters θ and φ by utilizing the stochastic gradient descent method, and θ and φ are simultaneously optimized.

When estimating the gradient dL/dφ by the Monte Carlo method, the variance can be large. Therefore, by using a variable conversion trick (also called a reparameterization trick), the gradient dL/dφ can be estimated faster.

For learning of q(z|x;φ) at the encoder and p(x|z;θ) at the decoder, a neural network is used.

[Procedure 3]: In procedure 3 (realized by the measurement unit 12) learned encoders and decoders are prepared, and probability p(x) by P is calculated with determination data which performs abnormality detection as an input. The probability p(x) is correlated with the abnormality degree of each dimension with respect to the output result of the learned encoder and decoder with respect to the determination data input.

[Procedure 4]: In procedure 4 (realized by measurement unit 12 or determination unit 13), probability p(x) is converted into score S(x) to be smoothed. For example, conversion processing includes logarithm and the like.

When the score S(x) value is bumpy, the smoothed version may be used as the output. For example, Locally Weighted Scatterplot Smoothing can be used.

However, when the rise of change is delayed by the above smoothing method, it is possible to adopt a smoothing method in which the rise of change is earlier.

[Procedure 5]: In procedure 5 (realized by the determination unit 13), when S(x) exceeds the threshold value, it is determined as abnormality.

With respect to certain processing actions, the abnormality detection system 1 learns the latent variable model and the joint probability model at the same time. Therefore, the abnormality detection system 1 does not require feature design. A neural network may be used for modeling the latent variable model and the joint probability model.

The abnormality detection system 1 is characterized in that input data in a step that simultaneously performs learning of the latent variable model and joint probability model is a multidimensional array or a tensor. Therefore, abnormality detection system 1 does not require prior knowledge about data and applications.

The abnormality detection system 1 consists of n sensors and learns n joint probability models. Therefore, according to the abnormality detection system 1, even if the number of sensors increases, the abnormality detection system 1 can deal with by learning a joint probability model. Specifically, abnormality can be detected by considering the correlation between n sensors.

The abnormality detection system 1 uses a neural network when learning the conditional probability p(z|x) and the conditional probability p(x|z). Therefore, according to abnormality detection system 1, learn can be performed linearly with respect to the number of parameters regardless of the number of sensor data observed.

According to the abnormality detection system 1, for example, sensor data transmitted from a large number of sensors provided in many machines, for example, a high dimensional sensor data including image data, or sensor data including combinations thereof can be handled integrally. Therefore, abnormality detection can be performed with higher efficiency and higher processing speed.

The abnormality detection system 1 uses SVM, LOF, or VAE when learning the latent variable model. Therefore, the abnormality detection system 1 can nonlinearly convert input data expression. In particular, when using VAE, non-linear conversion can be performed regardless of the number of parameters of input data.

When the abnormality detection system 1 uses VAE, the abnormality detection system 1 can learn similarity from sensor data. Therefore, the abnormality detection system 1 does not need to manually design the similarity design between sensor data.

When the abnormality detection system 1 uses VAE, the abnormality detection system 1 can acquire the characteristic which becomes the basis of sensor data by dropping the dimension of sensor data. Therefore, the abnormality detection system 1 can convert a wider range of data expressions.

When the abnormality detection system 1 uses VAE, the abnormality detection system 1 can convert data expressions not only by the number of parameters of data but also by linear calculation time. Therefore, the abnormality detection system 1 can perform conversion of data expressions with high efficiency.

In the abnormality detection system 1, devices in different places may be configured by communicating using communication means. The sensor data is sent to another arithmetic unit by a communication means, and learning and abnormality detection determination can be performed by the arithmetic unit.

For example, it is possible to perform a notification corresponding to an action determined by analyzing the determination result by the abnormality detection system 1 and an output processing to make predetermined control.

Also, the abnormality detection system 1 does not limit the location of each step. For example, installation of sensor and implementation of learning step can be performed in different places. The location of abnormality detection or abnormality determination is not particularly limited. The abnormality detection and the abnormality determination can be done in the same place or in different places.

In a second embodiment, although the abnormality detection system 1 according to the first embodiment has been mainly explained in the case of using VAE as a model of machine learning, in this second embodiment, a case in which adversarial auto encoder (AAE) is used as a model of machine learning will be described as follows.

Figure 8:
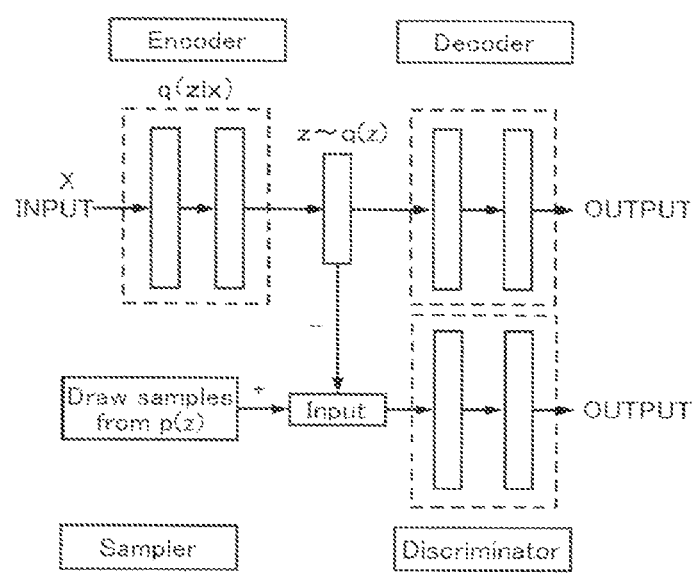
FIG. 8 is a conceptual diagram showing an abnormality detection system according to a second embodiment of the present invention using AAE.

FIG. 8 is a conceptual diagram showing an abnormality detection system according to a second embodiment of the present invention using AAE. When AAE is used for abnormality detection system, as shown in this FIG. 8, it is a feature to learn discriminators in addition to learning of encoder and decoder.

A flow of learning processing of AAE will be described. The learning of the AAE is performed in two stages of a restoration phase (Reconstruction phase) in which the encoder and the decoder are learned and a regularization phase in which the discriminator is learned. Learning at the restoration stage firstly inputs the training data x which is normal data to the encoder, infers the expression z (latent variable z) of the input data, inputs the expression z of the input data to the decoder, and generates the restored data x~. The latent variable model is to infer the expression z of the input data. The joint probability model is to generate the restored data x~ from the expression z. Next, the training data x is compared with the restored data x~ to calculate a reconstruction error. Then, by referring to the reconstruction error, the parameters of the encoder and decoder are updated, for example, by the stochastic gradient descent method so as to reduce the reconstruction loss.

In the learning at regularization stage, discriminators are learned, and at that time, learning is also performed for encoders that infer the expression $z_0$ of input data to be input to the discriminator. First, the training data x which is normal data is input to the encoder, and the expression $z_0$ of the input data is inferred based on the latent variable model, and on the other hand, sampling is performed from the sample generator (Sampler) to produce a false expression $z_1$. It is desirable to prepare multiple $z_0$ and $z_1$ for suitable learning. Based on $z_0$ and $z_1$, training data ($z_0$, 0), ($z_1$, 1) to be input to the discriminator are created. Here, 0 or 1 is a correct label. It indicates whether each training data is an expression $z_0$ based on normal data or a false expression $z_1$. In the discriminator, learning is performed so as to discriminate between expression $z_0$ based on normal data and false expression $z_1$ using the training data ($z_0$, 0), ($z_1$, 1). Specifically, in order to distinguish the training data ($z_0$, 0) based on the normal data from the false training data ($z_1$, 1) sampled from the sample generator (Sampler), the discriminator first updates the parameter of the discriminator. The discriminator then updates the parameters of the encoder to confuse the network for discrimination at the discriminator. The learned discriminator outputs the probability that the input is real data (the probability that the input is a sample of the prior distribution). In this way, a regularization error is obtained in the process of distinguishing between normal data and false data in the discriminator, and not only the discriminator but also the parameters of the encoder are updated and learned using the regularization error, so that this improves the accuracy of inference in the encoder and improves the discrimination accuracy of the discriminator.

A flow of abnormality detection processing using AAE will be described. A learned model is prepared with sufficient learning. The data of abnormality detection target is input into the encoder of the learned model, the expression of the data of abnormality detection target is inferred, and the restored data is generated from the expression in the decoder. The obtained restored data is compared with the input data of abnormality detection target, and abnormality is detected from the deviation between them. In addition, by inputting the expression of abnormality detection target data to the discriminator, it is possible to discriminate whether it is an expression based on normal data or a false expression.

As described above, according to the abnormality detection system using AAE, the latent variable model and the joint probability model are learned based on normal data in advance. At the same time, with regard to the discriminator, learning is performed. By using the discriminator's output, not only the discriminator but also the encoder and decoder are learned together. Therefore, highly accurate abnormality detection becomes possible. In AAE, complexity distribution can be used if sampling is possible, and therefore it is expected that the expressive power of the decoder is increased and the accuracy of generation is increased.

In a third embodiment, the case of using LVAE (Ladder Variational Auto Encoder: Ladder Variable Self Coder) as a machine learning model will be explained.

Figure 9:
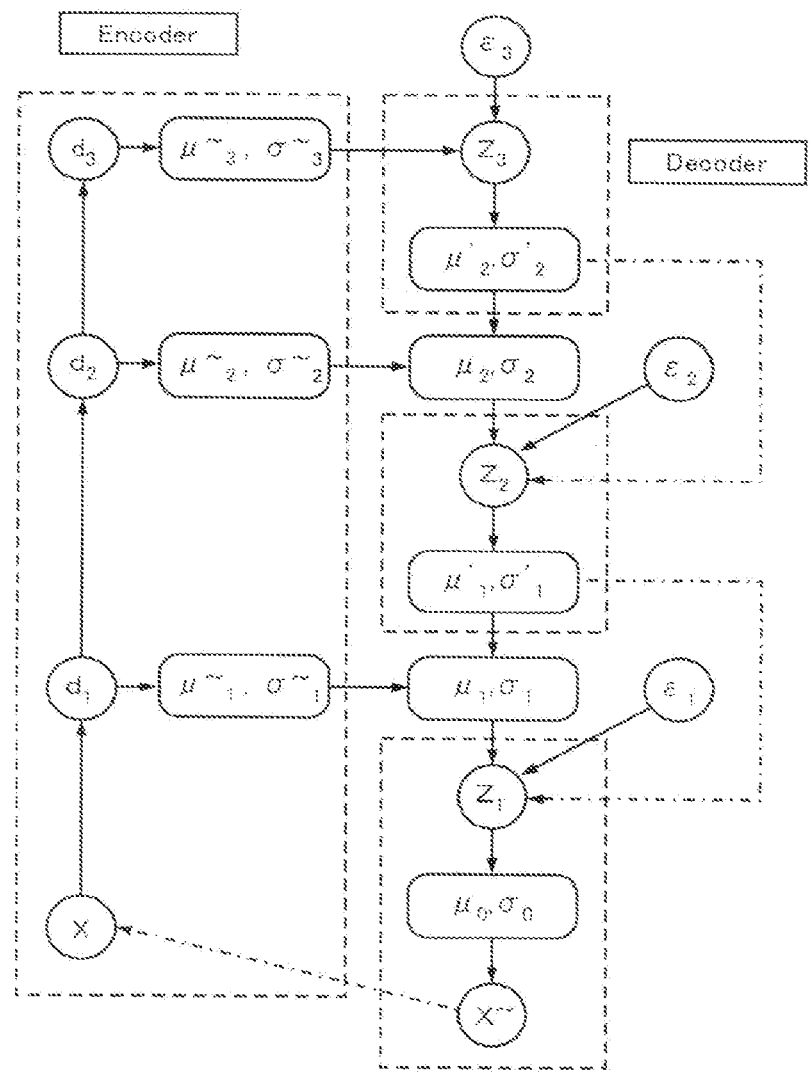
FIG. 9 is a conceptual diagram showing an abnormality detection system according to a third embodiment of the present invention using LVAE.

FIG. 9 is a conceptual diagram showing an abnormality detection system according to the third embodiment of the present invention using LVAE. When LVAE is used for the abnormality detection system, as shown in FIG. 9, learning of the encoder and the decoder is performed. There is a feature in that the parameters of the encoder are used while this decoder generates restored data from the expression z.

The flow of learning processing of LVAE will be described. In the learning of LVAE, the training data x, which is normal data, is input to the encoder, the expression z (latent variable z) of the input data is inferred, the expression z of the input data is input to the decoder, and the restored data x~ are generated. This feature is the same as the first and second embodiments. In detail, as shown in FIG. 9, in the latent variable model, the result for each hierarchy is obtained from the input data x through each hierarchy in the order of $d_1 \rightarrow d_2 \rightarrow d_3$, and finally the expression $z_3$ is generated. In the joint probability model, the result for each hierarchy is obtained from the expression $z_3$ through each hierarchy in the order of $z_3 \rightarrow z_2 \rightarrow z_1$, and finally the restored data $x^-$ is generated. The number of hierarchies is an example, and it is not limited thereto.

In the decoder, when generating restored data x~ via the order of $z_3 \rightarrow z_2 \rightarrow z_1$, the average $\mu^-_3$ and variance $\sigma^-_3$ obtained from $d_3$ in the encoder are used for sampling of $z_3$. By adding noise $\varepsilon_3$ at the time of sampling of $z_3$, error back propagation is enabled even if there is a stochastic function portion. Similarly, the average $\mu_2$ and the variance $\sigma^-_2$ obtained from $d_2$ in the encoder are used to find the average $\mu_2$ and the variance $\sigma_2$ for sampling of $z_2$. Similarly, the average $\mu^-_1$ and the variance $\sigma^-_1$ obtained from $d_1$ in the encoder are used to find the average $\mu_1$ and variance $\sigma_1$ for sampling of $z_1$. In this manner, in each layer of the decoder, processing of the decoder is performed by using parameters in the corresponding layer of the encoder. In this manner, the restored data x~ generated in the decoder is compared with the training data x to calculate the difference, and the parameters of each layer of the encoder and decoder are updated so as to eliminate the difference. After that, learning is repeated so that the training data x and restored data x~ coincide with each other.

A flow of abnormality detection processing using LVAE will be explained. A learned model with sufficient learning is prepared. The data of abnormality detection target is input into the encoder of the learned model, the expression of the data of abnormality detection target is inferred, and the restored data is generated from the expression in the decoder. The obtained restored data is compared with the input data for abnormality detection target, and abnormality is detected from the deviation between them.

As described above, according to the abnormality detection system using LVAE, decoders perform processing using the parameters in the corresponding layers of the encoder in each layer of the decoder. Therefore, by correcting the probability distribution modeled by the decoder in a data-dependent manner through the encoder, it is possible to properly perform learning even with a complicated model in which a plurality of sampling operations are performed.

In a fourth embodiment, the case of using auxiliary deep generative model (ADGM) as a machine learning model will be explained.

Figure 10:
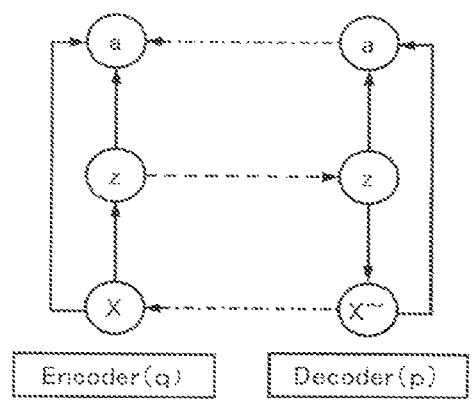
FIG. 10 is a conceptual diagram showing an abnormality detection system according to a fourth embodiment of the present invention using ADGM.

FIG. 10 is a conceptual diagram showing an abnormality detection system according to a fourth embodiment of the present invention using ADGM. In FIG. 10, a solid arrow represents the sampling process, a dashed arrow represents copy of data, and a dash-dotted arrow represents calculation of loss L. When ADGM is used for abnormality detection system, learning of the encoder and the decoder is performed as shown in this FIG. 10. However, this ADGM is an extension of the VAE concept of the first embodiment by adding the auxiliary variable a. In the ADGM, when the input data x, the latent variable z, and the auxiliary variable a are given, when the calculation flow of the arrow in FIG. 10 is expressed by an appropriate neural network, the probability distribution q(z|a, x), q(a|x), p(a|x, z), p(x|z) can all be calculated. It is assumed that p(z) is a given probability distribution (e.g., standard normal distribution).

The flow of learning processing of ADGM will be described. In the learning of ADGM, the training data x which is normal data is input into the encoder, the expression z (latent variable z) of the input data is inferred, the expression z of the input data is input into the decoder, and the restored data x~ is generated. The feature is the same as the first to third embodiments. In this fourth embodiment, further, processing is also performed to infer auxiliary variable a using the training data x and the expression z, and also to infer the auxiliary variable a from the expression z and restored data x~. Then, the value of the loss (error function) L is obtained by the following equation.

$$L = \log[p(x \sim | z)] + \log[p(a | x \sim, z)/q(a | x)] + \log[p(z)/q(z | a, x)]$$

Learning is repeated so that the value of the loss L becomes sufficiently small. Since it is difficult to directly calculate the log probability p(x) in the calculation of the loss L, it is obtained by maximizing the variational lower limit.

A flow of abnormality detection processing using ADGM will be explained. A learned model with sufficient learning is prepared. The data of abnormality detection target is input into the encoder of the learned model, the expression of the data of abnormality detection target is inferred, and the restored data is generated from the expression in the decoder. The obtained restored data is compared with the input data for abnormality detection target, and abnormality is detected from the deviation between them.

As described above, according to the abnormality detection system using the ADGM, the auxiliary variable a is introduced to the processing in the encoder and the decoder and the processing for inferring the auxiliary variable a is performed at the same time, and therefore, it is expected that the decoder will be able to model complex probability distributions and the accuracy of generation will be higher.

With regard to a method of abnormality detection, in the first embodiment, as a method of abnormality detection, it is described that the sensor data is determined to be normal or abnormal based on probability, and the method of this determination can also be adopted in the second to fourth embodiments. In the first to fourth embodiments, calculation of the probability is not performed, but deviation between the input data x and the restored data x~ may be calculated so as to detect abnormality or normality according to the amount of deviation. Specifically, the deviation of the component for each dimension of the input data x and the restored data x~ is obtained by performing calculations such as $(x_i - x_1 \sim)^2$, and if there is large deviation in any dimension, it may be determined to be abnormal.

A first improvement in learning and in abnormality detection is provided as follows. In the first to fourth embodiments, inference of values such as latent variable z, expression z, auxiliary variable a, and the like are respectively obtained by sampling from a stochastic function, but it has been explained that sampling is performed only once, and the latent variables z, the expression z, the auxiliary variable a, and the like are obtained to calculate the loss L. However, the present invention is not limited thereto. It is also possible to perform sampling a plurality of times, to calculate the loss L for each obtained value, and to obtain the average. By thus sampling multiple times, deviation in sampling can be absorbed, so it can be expected to improve learning efficiency and to improve abnormality detection accuracy.

In a second improvement in learning and in abnormality detection, in the first to fourth embodiments, in any of the learning process and abnormality detection process, the input data x is input to the encoder, the expression z (latent variable z) of the input data is inferred, and the expression z of the input data is input to a decoder to generate restored data x~, and abnormality detection is performed by comparing the input data x with the restored data x~. However, in this case, there is a case where the obtained restored data x~ is not sufficiently close to the value of normal data. Therefore, the restored data x~ obtained by one inference and generation process may be further input to the encoder. For example, the restored data close to the value of normal data can be obtained by repeating process including generating restored data $x_0\sim$ from input data x, generating restored data $x_1\sim$ from restored data $x_0\sim$, generating restored data $x_2\sim$ from restored data $x_1\sim$, inputting the obtained output to the encoder again. In this case, the loss L may be calculated for each process of inference and generation, and the sum of the losses L may be calculated, or the restored data finally obtained by repeating processing a plurality of times (in the example, restored data $x_2\sim$) may be compared with the input data x to calculate the loss L. In this way, by calculating the loss L after repeating a plurality of inferences and generation processes, improvement of learning efficiency and improvement of abnormality detection accuracy can be expected.

Other embodiments are described as follows. The abnormality detection system 1 can be used for a failure prediction system of a machine and an electronic device. The failure prediction system according to the present embodiment not only predicts event that can occur by sequentially processing data collected from various data sources but also realizes controlling, with a series of operation, determination of appropriate action (countermeasure) for the detected event (occurrence of event) and output processing for performing notification corresponding to the action determined for the related system and the predetermined control.

In addition, for the determined action (occurred event), the actual action result (including the case where the action itself is not performed) actually performed by the related system is accumulated as feedback information, and the detection precision of the event is improved to make it possible to provide additional information that is highly usable for the system linked with the supervisory control system.

For example, it is possible to use for a failure prediction system of multiple industrial machines and robots in factories, and it is possible to use for an abnormality prediction system of infrastructure such as electric power. It is possible to use for an abnormality prediction system of multiple parts such as aircraft and automobiles.

The abnormality detection system 1 can be used for prediction system of replacement time of consumables and parts. The prediction system according to the present embodiment not only predicts event that can occur by sequentially processing data collected from various data sources but also realizes controlling, with a series of operation, determination of appropriate action (countermeasure) for the detected event (occurrence of event) and output processing for performing notification corresponding to the action determined for the related system and the predetermined control.

In addition, for the determined action (occurred event), the actual action result (including the case where the action itself is not performed) actually performed by the related system is accumulated as feedback information, and the detection precision of the event is improved to make it possible to provide additional information that is highly usable for the system linked with the supervisory control system.

For example, it is possible to use for prediction and notification of the replacement timing of consumables including engine oils of aircraft, automobiles, and the like. It is possible to use for prediction and notification of the replacement timing of consumables such as drill teeth of a machine tool.

The abnormality detection system 1 can be used for a general purpose supervisory control system. The supervisory control system according to the present embodiment not only detects event that can occur by sequentially processing data collected from various data sources but also realizes controlling, with a series of operation, determination of appropriate action (countermeasure) for the detected event (occurrence of event) and output processing for performing notification corresponding to the action determined for the related system and the predetermined control.

In addition, for the determined action (occurred event), the actual action result (including the case where the action itself is not performed) actually performed by the related system is accumulated as feedback information, and the detection precision of the event is improved to make it possible to provide additional information that is highly usable for the system linked with the supervisory control system.

For example, it can be used for home security monitoring system. It can also be used for monitoring systems such as buildings, public facilities, horticulture and the like.

The abnormality detection system 1 can be used for network security monitoring system. The monitoring system according to the present embodiment realizes controlling, with a series of operation, detection of an event that can occur by sequentially processing data collected from various data sources, determination of appropriate action (countermeasure) for the detected event (occurrence of event), and output processing for performing notification corresponding to the action determined for the related system and the predetermined control.

In addition, for the determined action (occurred event), the actual action result (including the case where the action itself is not performed) actually performed by the related system is accumulated as feedback information, and the detection precision of the event is improved to make it possible to provide additional information that is highly usable for the system linked with the supervisory control system.

The abnormality detection system 1 can be used for medical imaging diagnostic system. The image diagnosis system according to the present embodiment realizes controlling, with a series of operation, detection of an event that can occur by sequentially processing data collected from various data sources, determination of appropriate action (countermeasure) for the detected event (occurrence of event), and output processing for performing notification corresponding to the action determined for the related system and the predetermined control.

In addition, for the determined action (occurred event), the actual action result (including the case where the action itself is not performed) actually performed by the related system is accumulated as feedback information, and the detection precision of the event is improved to make it possible to provide additional information that is highly usable for the system linked with the supervisory control system.

For example, CT or NMR image recognition technology is used for early detection and early treatment of cancer. In past systems, abnormality and phenomena were found from these images by doctor's advanced expertise and judgment of doctors who have extensive experience. However, by using this system, it is possible to detect an abnormal phenomenon (an abnormal tissue image different from a normal tissue image pattern) with higher accuracy and speed.

The abnormality detection system 1 can be used for quality control of cell preparations in regenerative medicine. The image diagnosis system according to the present embodiment realizes controlling, with a series of operation, detection of an event that can occur by sequentially processing data collected from various data sources, determination of appropriate action (countermeasure) for the detected event (occurrence of event), and output processing for performing notification corresponding to the action determined for the related system and the predetermined control.

In addition, for the determined action (occurred event), the actual action result (including the case where the action itself is not performed) actually performed by the related system is accumulated as feedback information, and the detection precision of the event is improved to make it possible to provide additional information that is highly usable for the system linked with the supervisory control system.

For example, when inducing the differentiation of pluripotent stem cells into stem cells, progenitor cells or differentiated cells of each tissue, the heterogeneity of the cell preparation which is the final product due to the non-uniform differentiation efficiency is a problem. Therefore, by using abnormality detection system 1, abnormal cell images different from normal cell image patterns can be detected with higher accuracy and speed.

In the configurations described in each embodiment of the abnormality detection system 1 above, the abnormality detection system 1 which is merely an example can be appropriately changed within a range not deviating from the technical idea. Further, the configurations described in the respective embodiments may be used in combination as long as they do not contradict each other.

As described above, the abnormality detection system 1 can be realized by one or a plurality of computer devices, and each function can be configured as a program. For example, it is stored in the auxiliary storage device 105 shown in FIG. 2, the control unit such as the CPU 100 reads the program for each function of the monitoring control system stored in the auxiliary storage device 105 to the RAM 101, the control unit executes the program read to the RANI 101, and the respective functional blocks of the present embodiment can be operated by one or a plurality of computers. That is, one or a plurality of computers in which program of each function of the monitoring control system of the present embodiment is installed can operate as a computer device (system) performing each function alone or in cooperation.

In addition, the above program is a state recorded in a computer-readable recording medium, and examples of computer readable recording media which can be provided to the computer include an optical disk such as a CD-ROM, a phase change type optical disk such as a DVD-ROM, magnetooptical disks such as magnet optical (MO) or mini disk (MD), magnetic disks such as floppy (registered trademark) disks and removable hard disks, memory cards such as compact flash (registered trademark), smart media, SD memory cards, memory sticks, and the like. Further, a hardware device such as an integrated circuit (IC chip or the like) specially designed and constructed for the purpose of the present invention is also included as the recording medium.

Although the embodiment of the present invention has been described, the embodiment has been presented as an example, and it is not intended to limit the scope of the invention. This novel embodiment can be implemented in various other forms, and various omissions, substitutions, and changes can be made without departing from the gist of the invention. These embodiments and modifications thereof are included in the scope and gist of the invention and are included in the invention described in the claims and the equivalent scope thereof.

As shown in the Figs., a Reference Signs List is as follows:

1 abnormality detection system
10 storage unit
11 acquisition unit
12 measurement unit
13 determination unit
14 learning unit

The invention claimed is:

1. A system comprising: one or more memories; and one or more processors configured to output information relating to anomaly of target data inputted into the system using at least a part of a deep generative model configured to generate data corresponding to normal data, wherein the one or more processors are configured to obtain a representation of the target data based on the target data using an encoder, and generate data corresponding to the target data based on the obtained representation using at least the part of the deep generative model.

2. The system according to claim 1, wherein the information relating to anomaly of the target data includes data indicative of an anomalous part of the target data.

3. The system according to claim 1, wherein the deep generative model is configured to learn a probability distribution with respect to the normal data.

4. The system according to claim 1, wherein the deep generative model is learned using normal data.

5. The system according to claim 1, wherein the one or more processors are configured to generate data corresponding to the target data using at least the part of the deep generative model, and output the information relating to anomaly of the target data based on at least the generated data corresponding to the target data.

6. The system according to claim 5, wherein the one or more processors are configured to calculate, as the information relating to anomaly of the target data, a score based on at least (i) the generated data corresponding to the target data and (ii) the target data.

7. The system according to claim 6, wherein the score is calculated for each dimension of the target data.

8. The system according to claim 1, wherein the one or more processors are configured to use the information relating to anomaly of the target data to determine whether or not the target data is anomalous.

9. The system according to claim 1, wherein the deep generative model is a VAE (Variational Autoencoder), an AAE (Adversarial Autoencoder), a LVAE (Ladder Variational Autoencoder), or ADGM (Auxiliary Deep Generative Model).

10. A method comprising: receiving target data that is to be processed by an anomaly detection system; and obtaining information relating to anomaly of the received target data using at least a part of a deep generative model configured to generate data corresponding to normal data, wherein, in the obtaining of the information, a representation of the target data is obtained based on the target data using an encoder, and data corresponding to the target data is generated based on the obtained representation using at least the part of the deep generative model.

11. The method according to claim 10, wherein the information relating to anomaly of the target data includes data indicative of an anomalous part of the target data.

12. The method according to claim 10, wherein the deep generative model is configured to learn a probability distribution with respect to the normal data.

13. The method according to claim 10, wherein the deep generative model is learned using training data of the normal data.

14. The method according to claim 10, further comprising generating data corresponding to the target data using at least the part of the deep generative model, wherein the information relating to anomaly of the target data is based on at least the generated data corresponding to the target data.

15. The method according to claim 14, further comprising calculating, as the information relating to anomaly of the target data, a score based on at least (i) the generated data corresponding to the target data and (ii) the target data.

16. The method according to claim 15, wherein the score is calculated for each dimension of the target data.

17. The method according to claim 10, wherein the information relating to anomaly of the target data is used to determine whether or not the target data is anomalous.

18. The method according to claim 10, wherein the deep generative model is a VAE (Variational Autoencoder), an AAE (Adversarial Autoencoder), a LVAE (Ladder Variational Autoencoder), or ADGM (Auxiliary Deep Generative Model).

19. A non-transitory computer readable medium storing instructions that cause to a computer to execute a method, the method comprising: receiving target data that is to be processed by an anomaly detection system; and obtaining information relating to anomaly of the received target data using at least a part of a deep generative model configured to generate data corresponding to normal data, wherein, in the obtaining of the information, a representation of the target data is obtained based on the target data using an encoder, and data corresponding to the target data is generated based on the obtained representation using at least the part of the deep generative model.

\* \* \* \* \*